Patented Dec. 13, 1938

2,139,747

UNITED STATES PATENT OFFICE 2,139,747

IMPREGNATION SOLUTIONS

Bror Olof Häger, Stockholm, Sweden, assignor to Bolidens Gruvaktiebolag, Stockholm, Sweden, a limited joint-stock company of Sweden No Drawing. Application January 9, 1936, Serial No. 58,323. In Sweden October 22, 1935

5 Claims. (Cl. 134—78.6)

The present invention relates to an impregnation solution for use in impregnating wood and other organic substances containing cellulose or lignin. The invention is based on the idea that, after the impregnation has been done, the matters contained in the solution are to be chemically converted in such a manner that one or several difficultly soluble impregnation agents separate out or precipitate in the substance or material being impregnated. A substance adapted to form the basis of such a solution is, for example, alkaline bichromate which, under suitable conditions, admits of being reduced in, for instance, wood.

The present invention consists in an impregnating solution for wood and like material made by mixing alkali bichromate (for instance $Na_2Cr_2O_7$) and arsenic acid ($H_3AsO_4$) with zinc compounds such that upon reduction of the bichromate by the material the alkali formed will be neutralized by the acid in one of the zinc compounds and a difficultly soluble zinc arsenate and chromium arsenate will be formed.

The principle underlying the present invention may be exemplified by a solution having, for example, the following composition: $Na_2Cr_2O_7$ (alkali bichromate) $+ZnCl_2$ (zinc chloride) $+ 2ZnO$ (zinc oxide) $+5H_3AsO_4$ (arsenic acid), in which the proportions by weight are as follows:

|                    | Per cent |
|--------------------|----------|
| Sodium bichromate  | 20.6     |
| Arsenic acid       | 55.9     |
| Zinc oxide         | 12.8     |
| Zinc chloride      | 10.7     |

When the bichromate in this solution is reduced, the alkali contained in the bichromate is liberated and will, in the case under consideration, be neutralized by the chlorion in the zinc chloride. The acidity of the solution decreases still more due to the fact that the chromium after the reduction will be present as a positive ion and precipitates out together with some arsenic acid, in the form of chromium arsenate. After these processes, there is nothing present that could maintain zinc arsenate in solution and hence also said arsenate separates out, and thus, the solution contains no matters having any essential mycocidous action. Zinc chloride may be replaced by zinc sulphate, nitrate or acetate.

In practice it has been found that it sometimes is preferable to use an easily soluble zinc salt, for instance zinc sulphate or zinc chloride, instead of zinc oxide, in preparing the impregnating solution and that in order to neutralize the mineral acid in the zinc salt, part of the arsenic acid is substituted by sodium arsenate or compounds yielding sodium arsenate. The composition of the solution will therefore, by way of example, be substantially as follows:

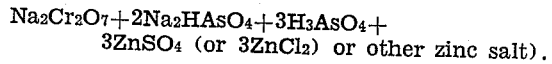

$Na_2Cr_2O_7+2Na_2HAsO_4+3H_3AsO_4+$
$3ZnSO_4$ (or $3ZnCl_2$) or other zinc salt).

The present invention also consists in a method of producing the improved or modified impregnating solution for wood and like material as set forth in the preceding paragraph characterized by first dissolving sodium arsenate, (or compounds yielding sodium arsenate, such as mixtures of soda and arsenic acid or anhydrous arsenic acid ($As_2O_5$), bichromate and arsenic acid either each by itself or two or three together, and then adding the zinc salt either in solid form or in the form of a solution.

Preferably the amount of added sodium arsenate is such that the arsenic content of the sodium arsenate is between 20 and 50% of the total amount of arsenic in the solution.

Having thus described my invention I declare that what I claim is:—

1. An aqueous impregnating solution for wood and like material made by mixing an alkali bichromate and a compound capable of supplying arsenic acid radical with zinc oxide and a salt from the class consisting of zinc chloride, zinc sulfate, zinc nitrate and zinc acetate, whereby upon reduction of the alkali bichromate in situ the alkaline substance produced will be neutralized by the acid radical produced by the zinc salt with resultant production of difficultly soluble zinc arsenate and chromium arsenate.

2. An aqueous impregnating solution for wood and like material made by mixing approximately 20.6 per cent sodium bichromate, 55.9 per cent of arsenic acid, 12.8 per cent of zinc oxide and 10.7 per cent of zinc chloride, whereby upon reduction of the sodium bichromate in situ, the alkaline substance produced will be substantially neutralized by the acid radical produced by the zinc chloride with resultant production of difficultly soluble zinc arsenate and chromium arsenate.

3. An aqueous impregnating solution for wood and like material made by mixing an alkali bichromate, arsenic acid and sodium arsenate, with a zinc salt from the class consisting of zinc chloride, zinc sulfate, zinc nitrate and zinc acetate, whereby upon reduction of the alkali bichromate in situ the alkaline substance produced will be substantially neutralized by the acid radical produced by the zinc salt with resultant production of difficultly soluble zinc arsenate and chromium arsenate.

4. An aqueous impregnating solution for wood and like material made by mixing an alkali bichromate, arsenic acid and an alkali arsenate, with at laest one water-soluble zinc salt, whereby upon reduction of alkali bichromate in situ the alkaline substance produced will be substantially neutralized by the acid radical produced by the zinc salt with resultant production of difficultly soluble zinc arsenate and chromium arsenate, the amount of alkali arsenate being such that the arsenic content thereof is between 20 and 50 per cent of the total amount of arsenic in the solution.

5. The method of preparing an impregnating solution for wood and like materials which comprises producing an aqueous solution of sodium arsenate, alkali bichromate, and arsenic acid, and adding to the solution thus produced a water-soluble zinc salt.

BROR OLOF HÄGER.